US007749308B2

(12) United States Patent
McCully

(10) Patent No.: US 7,749,308 B2

(45) Date of Patent: Jul. 6, 2010

(54) METHOD FOR REDUCING HYDROCARBON EMISSIONS

(76) Inventor: Tim McCully, 16819 Grouse Moor, Houston, TX (US) 77084

( * ) Notice: Subject to any disclaimer, the term of this patent is extended or adjusted under 35 U.S.C. 154(b) by 607 days.

(21) Appl. No.: 11/619,010

(22) Filed: Jan. 2, 2007

(65) Prior Publication Data

US 2007/0151603 A1 Jul. 5, 2007

Related U.S. Application Data

(60) Provisional application No. 60/755,929, filed on Jan. 3, 2006.

(51) Int. Cl.
*B01D 19/00* (2006.01)

(52) U.S. Cl. ............................ 95/166; 95/169; 95/291

(58) Field of Classification Search .................. 95/166, 95/169, 95, 104, 291; 137/7
See application file for complete search history.

(56) References Cited

U.S. PATENT DOCUMENTS 3,864,102 A * 2/1975 Powers .......................... 95/39
5,453,114 A * 9/1995 Ebeling ........................ 95/166
5,490,873 A 2/1996 Behrens et al.
5,618,408 A 4/1997 Poirier et al.
6,997,255 B2 2/2006 Wellington et al.

FOREIGN PATENT DOCUMENTS

GB 2 438 415 * 11/2007
WO WO 02/44601 * 6/2002

* cited by examiner

*Primary Examiner*—N. Bhat
(74) *Attorney, Agent, or Firm*—Law Office of Tim Cook P.C.

(57) ABSTRACT

A system for recovering and recycling otherwise vented or flared volatile and non-volatile reactive organic materials from pipeline and plant operations associated with oil and gas recovery, refining and petrochemical manufacture, processing and transportation includes a means to remove and store volatile hydrocarbons for a portion of a system or pipeline.

11 Claims, 2 Drawing Sheets

METHOD FOR REDUCING HYDROCARBON EMISSIONS

This application claims the benefit of U.S. Provisional Patent Application No. 60/755,929 filed Jan. 3, 2006.

FIELD OF THE INVENTION

The invention relates generally to reducing emissions of volatile compounds. More particularly, the invention is a method for reducing emissions of highly reactive volatile organic compounds from pipeline operations associated with oil and gas recovery, production, refining, and petrochemical manufacture, processing, and transportation.

BACKGROUND OF THE INVENTION

Many oil, gas, and petrochemical pipeline operations, including pigging, swabbing, changes of meter parts, pipeline inspection maintenance (PIM), and the like, produce emissions of volatile organic compounds in associated venting or flaring operations. Pipeline operations also generally cover considerable distances, making it difficult and expensive to deal with these types of emissions.

Over the past few years, there has been more and more regulation of emissions of contaminants into the air. The passage of the Clean Air Act Amendments of 1990, the Kyoto Accord, and other regulations have set the stage for the reduction of air emissions worldwide. Reduction of air emissions is a priority for both countries and companies.

Air emissions in the United States are regulated by the Environmental Protection Agency (EPA). The EPA is the agency directly responsible for regulating air emissions in many states; however, in certain states the responsibility for regulatory compliance has been delegated to state agencies, e.g., in California, Texas, Louisiana, and others. Each state that has the responsibility for regulatory compliance must submit a State Implementation Plan (SIP) to the EPA for approval. The goal of the SIP is to implement federal standards in a manner that reflects the priorities and conditions of air emissions within the state. The SIP can be more stringent than the federal standards but not less so.

The Clean Air Act Amendments of 1990, and earlier legislation, divide a state or region into "attainment" and "non-attainment" areas. The "attainment" areas are those geographic areas considered capable of meeting federal standards for air quality. The "non-attainment" areas are those geographic areas that cannot meet or attain air quality standards. Those that emit pollutants into the air in "non-attainment" areas have to implement more stringent performance standards to reduce emissions. These more stringent standards extend to businesses in certain "SIC" code categories and can even extend to the general public for automobiles to meet certain emissions standards.

"Non-attainment" areas generally have more stringent criteria for certain air emissions. These criteria can include reduced allowable emissions of the oxides of nitrogen (NOx) or reduced allowable emissions of smog precursors such as VHAP's or HRVOC's. A "VHAP" is an acronym/abbreviation for 'Very Hazardous Air Pollutant' and HRVOC is an acronym/abbreviation for 'Highly Reactive Volatile Organic Compound'. Since VHAP's and HRVOC's are smog precursors, recent SIP proposals to the EPA have stated that smog, a criteria pollutant, may be limited by controlling the amount of VHAP's and HRVOC's that are emitted to the atmosphere. Indeed, many regulated areas are beginning to place emissions "caps" on identified atmospheric pollutants, a "cap" meaning that there is a certain amount that a business entity can emit without an economic penalty and when the "cap" is exceeded then economic penalties are incurred.

With the introduction of the allowable emission "cap", long-standing practices in the production, manufacturing, refining, transportation, and distribution of chemical and refined products must be examined. Recent SIP documents have resulted in regulations for HRVOC materials that define, limit, and establish the basis for documenting HRVOC emissions. HRVOC emissions events can be categorized as any of the following activities: a) venting HRVOC material to the atmosphere; b) flaring HRVOC material to the atmosphere; and c) fugitive emissions from equipment.

Venting and flaring of hydrocarbons has been done since the earliest days of oil and gas production. Early oil production had excess natural gas co-produced with the oil. Since there was no market for this co-produced gas, the gas was vented or flared. Old stories abound that the sky was lighted so brightly at night by flared gas that one could read a newspaper virtually anywhere oil was being produced.

As refining and petrochemical industries began to process "deeper into the barrel", flaring and venting continued to play a primary role in plant safety. Pressure relief, with the accompanying venting and flaring, was then and continues to be one of the primary methods of assuring safety in refining and petrochemical facilities. Venting and flaring have long been accepted and unquestioned practices in the refining and chemical industries.

Over the past several years there has been increased environmental awareness that has resulted in laws and regulations implementing those laws to promote "cleaner" air and reduced earth-warming gases. Man has finally achieved a level of activity in emissions to the atmosphere and energy consumption that the earth's atmosphere is being profoundly affected. Regulatory response has been ever more stringent regulation of emissions to the atmosphere of "criteria" pollutants, including oxides of nitrogen, oxides of sulfur, earth-warming gases, carbon dioxide, volatile organic compounds, volatile hazardous air pollutants, and highly reactive volatile organic compounds. It should be noted that regulations generally do not eliminate certain activities, but rather promote regulatory "complexities" in the form of more stringent specifications and reporting requirements that create incentives to "do things a different way". This is the case with both flaring and venting operations in industrial applications.

Accordingly, there exists a need for a method for reducing emissions of volatile organic compounds in pipeline and other operations and that is the subject of the present invention.

SUMMARY OF THE INVENTION

The present invention provides a system of recovering and recycling the otherwise vented or flared volatile and non-volatile reactive organic materials from pipeline and plant operations associated with oil and gas recovery, refining and petrochemical manufacture, processing and transportation.

Emissions of organic compounds that include the HAP, VHAP, and HRVOC compounds from such operations have in the past been disposed of by venting. To avoid putting such "hazardous air pollutants" (HAP) and "very hazardous air pollutants" (VHAP) into the atmosphere, such emissions are typically flared, that is, they are disposed of by burning. This invention/process provides an alternative to flaring and recycles products to a useful purpose rather than sending such products to the atmosphere.

There are many operations in which this invention is applicable. Typically, these operations are those in which flaring is performed during some operational procedure. The invention is applicable in virtually every instance that requires equipment to be "blown down", including pipeline and equipment maintenance and startup and shutdown operations and filter and flow meter servicing. The invention is specifically applicable in any pipeline and plant operations that include a system of piping and valves adapted to be opened and closed without disturbing product flow in the main system, for example, to insert or remove pipeline pigs or swabs.

The invention comprises, in part, a set of pipes, valves, pumps, and associated equipment to connect operatively with the drain valves and blowdown valves that are typically associated with a pig trap or other isolation vessel associated with a maintenance or service operation that has a set of blocking valves and the necessary drainage and blowdown valves. Through these connections, organic compounds that are isolated between the blocking valves are caused to flow into a product recovery tank that may be located on a truck bed or some other suitable portable carrying means.

Once the products have been essentially completely recovered from the pig trap or other isolation vessel, the entire recovery system may be purged of organic materials so that it is safe to close and disconnect.

It should be noted that the initial flow from the pig trap or isolation vessel will ordinarily be due to the existing pressure as well as product volatility of some (but not all) of the products being handled by the main system. Thereafter, nitrogen or any other appropriate purging gas (even methane or natural gas could also be used to advantage in some processes), may be employed to complete the product recovery phase.

The final part of the product recovery phase is typically performed under pressure. First, a "purging" phase is conducted, to "push" the organic materials through the collection system with a suitable gas, such as nitrogen. Thereafter, where appropriate, a suitable vacuum may be applied to help vaporize and remove the remaining hydrocarbons. This is especially helpful with volatile organic compounds, the preferred target of this process. On materials like crude oil with considerably lower vapor pressures, applying a vacuum accomplishes very little. However, on materials such as propylene, butenes (alkenes), and the lighter alkanes (defined as having eight or fewer carbon atoms), which products tend to vaporize relatively easily, a vacuum is advantageously applied. The equipment used in the process of the invention is adapted to handle both positive and negative pressures.

The method of the invention basically involves:

1) Connecting a product recovery tank and negative pressure generator apparatus to a pipeline, under appropriate safety precautions, at a location where a pipeline operation is underway or planned;
2) Shutting down product flow;
3) Collecting at such location residual product that has been isolated at such location as a result of the shut down into the product recovery tank;
4) Recovering the collected product, using negative pressure where necessary, by purging the residual product from the product recovery tank to assure essentially complete recovery;
5) Either, a) returning the recovered product to the pipeline or b) recycling the product as a useful product at a different location; and
6) Disconnecting the product recovery tank and making sure everything is again in the normal operating mode and safe to resume normal operations.

The method of the invention requires at least one trained operator and a portable unit that may be affixed on the bed of a truck but can also be transported to the appropriate location by other mobile transport means, as will be understood by those skilled in this art. The method sometimes also requires the cooperation of those employed at the specific pipeline operation at which the method is to take place.

The portable unit used in this invention method may comprise:

1. A product recovery vessel, which is typically a tank suitably sized to collect all residual hydrocarbon that has been isolated and collected at the operation shut down site;
2. The necessary flexible piping and associated hardware to connect the product recovery vessel to the pipeline portion or collection vessel in which the residual hydrocarbon has been isolated;
3. Purging means, adapted to assure that essentially all residual hydrocarbon that has been collected is removed from the pipeline portion or vessel in which it has been collected; and
4. Recycling means, adapted to return the hydrocarbon product that has been collected in the product recovery vessel to the pipeline or plant facility, or to empty the product recovery vessel at another location.

The purging means and the recycling means used as described above may be powered by an internal combustion engine that is no larger than that typically found on motor vehicles, specifically automobiles. The engine, suitably sized to accomplish the desired purging and pumping operations, is adapted to generate the determined negative or positive pressure by any means suitable and well within the skill of those having ordinary skill in this art. It will also be noted and understood by those skilled in this art that the engine may also be adapted to run on the particular volatile hydrocarbon that is being recovered, or a mixture of such a hydrocarbon mixed with a suitable natural gas, gasoline, or diesel fuel.

The recovery of the products and the subsequent combustion/oxidation of the vapors of the VOC's, further reduces the "potential to emit".

DETAILED DESCRIPTION OF PREFERRED EMBODIMENTS

Advantageously, the present invention provides for the reduction of venting and flaring in pipeline operations associated with oil and gas production and petrochemical manufacturing and refining. This is accomplished by operating several systems together to accomplish the stated objectives of: i) reducing venting and flaring to the atmosphere; ii) maximizing product recovery; iii) documenting the operation to assure regulatory agencies that objectives were accomplished.

Figure 1:
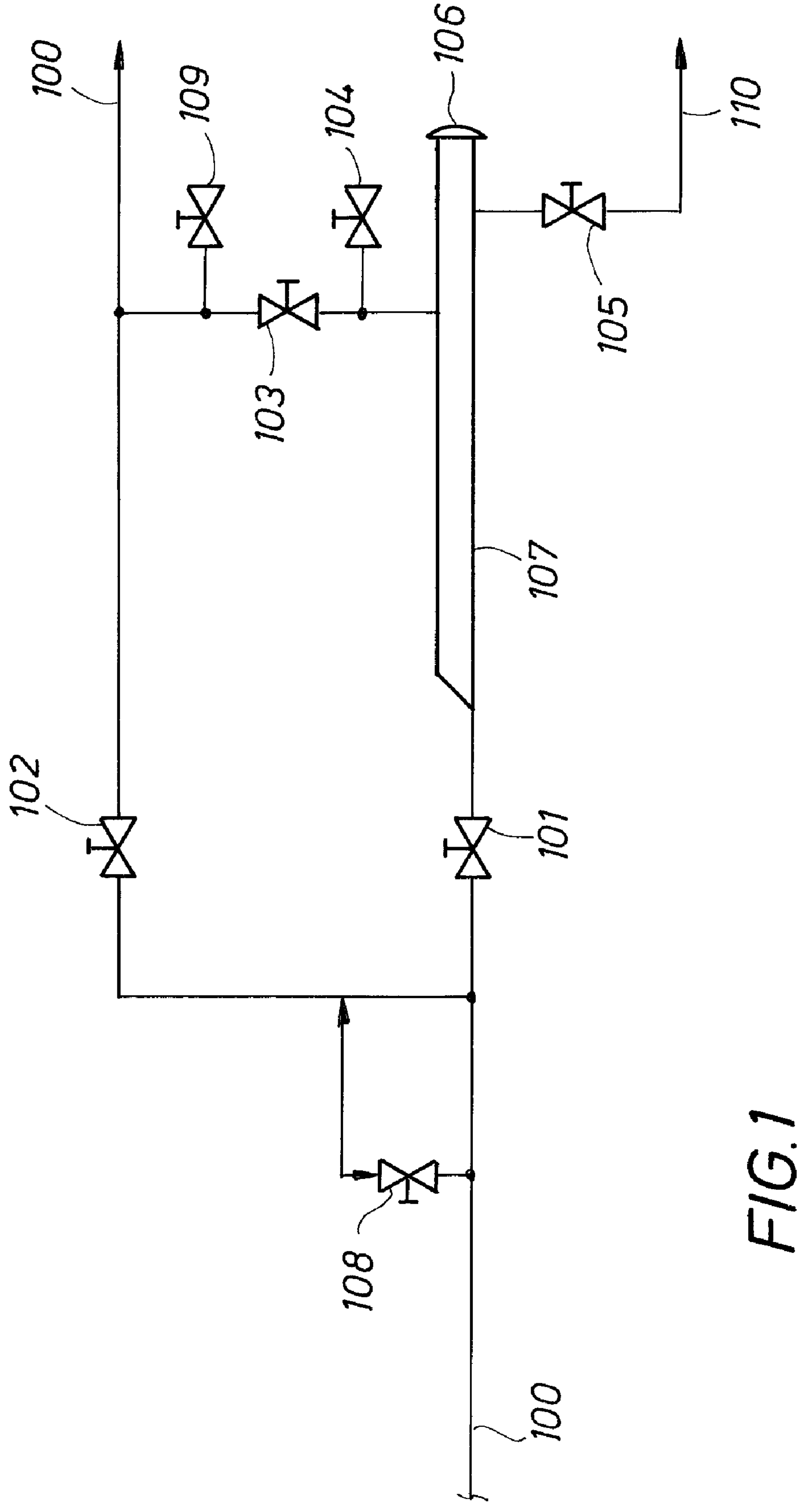
FIG. 1 is a piping diagram illustrating a pig trap arrangement in a typical pipeline system.

An example is used below of a "pigging" operation, where a "pig" or "swab" is received into a pipeline "pig trap". A pig trap is a system of piping and valves constructed to receive a "pig" or "swab" and is generally arranged as shown in FIG. 1. While the example shows a pertinent application of the invention, the example is only one of many areas of application of the invention.

Description of Normal Pig Trap Operation

In normal operation of a pipeline 100, a trap bypass valve 102 is open and a trap valve 101 and a trap jump over valve 103 are closed. The trap valve 101 and the trap jump over valve 103 serve to isolate a pig trap 107. The system also includes a test valve 108 up to 1500 feet upstream of the pig trap 107.

When the pigging operation is initiated, the trap valve 101 and the trap jump over valve 103 are both opened and the trap bypass valve 102 is closed. Once a pig (not shown) is captured within the pig trap 107, the trap bypass valve 102 is opened and the trap valve 101 and the jump over valve 103 are closed. This action isolates the pig in the pig trap. Before a trap closure 106 can be opened and the pig removed from the pipeline system, a drain valve 105 is opened for the isolated pipeline product material to be vented or flared to the atmosphere through a discharge line 110. Once the drain valve 105 is opened, the trap can be purged by attaching a nitrogen connection to a blow down valve 104. The nitrogen purge then purges the excess material from the pig trap through the drain valve 105. Once the pig trap has been purged, the trap closure 106 can be opened to remove the pig.

When the trap closure 106 is opened, in many cases, personnel working in the area must be in personnel protective equipment (PPE) that may include protective clothing or special breathing apparatus to insure the health and safety of the personnel in the area. Indeed, in many cases, liquid is trapped behind the pig and this liquid is spilled on the ground or a container on the ground and must be placed in drums later. This trapped liquid is easily handled by placing a “T-handle” (like a pipeline location probe) in the trap 107 with the “T-handle” butting up to the closure 106 and the length of the “T-handle” that extends from the pig trap closure flange past the jump over piping connection including jump over valve 103. This enables the pig to end its journey in the pig trap slightly higher and allowing trapped liquids to pass into the drain. This helps assure that the pig trap is properly emptied in the purge procedure and makes a safer entry of the pig into the pig trap with a minimum of trapped hydrocarbons.

Description of Pig Trap Operation and the Invention

The method of the present invention eliminates the waste of the fluid that would otherwise result from the operation of the prior art as just described. The method of this invention may define different operating modes. These modes can be described as follows:

1) Connecting the invention and taking safety precautions;
2) Product Recovery Mode;
3) Product purge mode;
4) a) Product Return mode where the product is returned to the pipeline, or
   b) product recycle mode where the product is recycled as a useful product at a different location; and
5) Disconnecting and making sure everything is again in the normal operating mode and safe to resume normal operations.

As previously described, in normal pipeline operation, the trap bypass valve 102 is open and the trap valve 101 and the trap jump over valve 103 are closed. When the pigging operation is initiated the trap valve 101 and the trap jump over valve 103 are both opened and the trap bypass valve 102 is closed. Once the pig has been received in the pig trap 107, the trap bypass valve 102 is opened and the trap valve 101 and the jump over valve 103 are closed. This action isolates the pig in the pig trap along with remaining product. The invention is ready to be attached to the components in the pig trap.

Connecting the Invention and Taking Safety Precautions

The purpose of the following safety precautions section is to set up the invention, preferably at a shop prior to moving the invention to a work site, and then to connect the invention properly to operating equipment. This section provides a checklist and a description of all of the valve positions and equipment states that should exist for the invention when operations are initiated.

Figure 2:
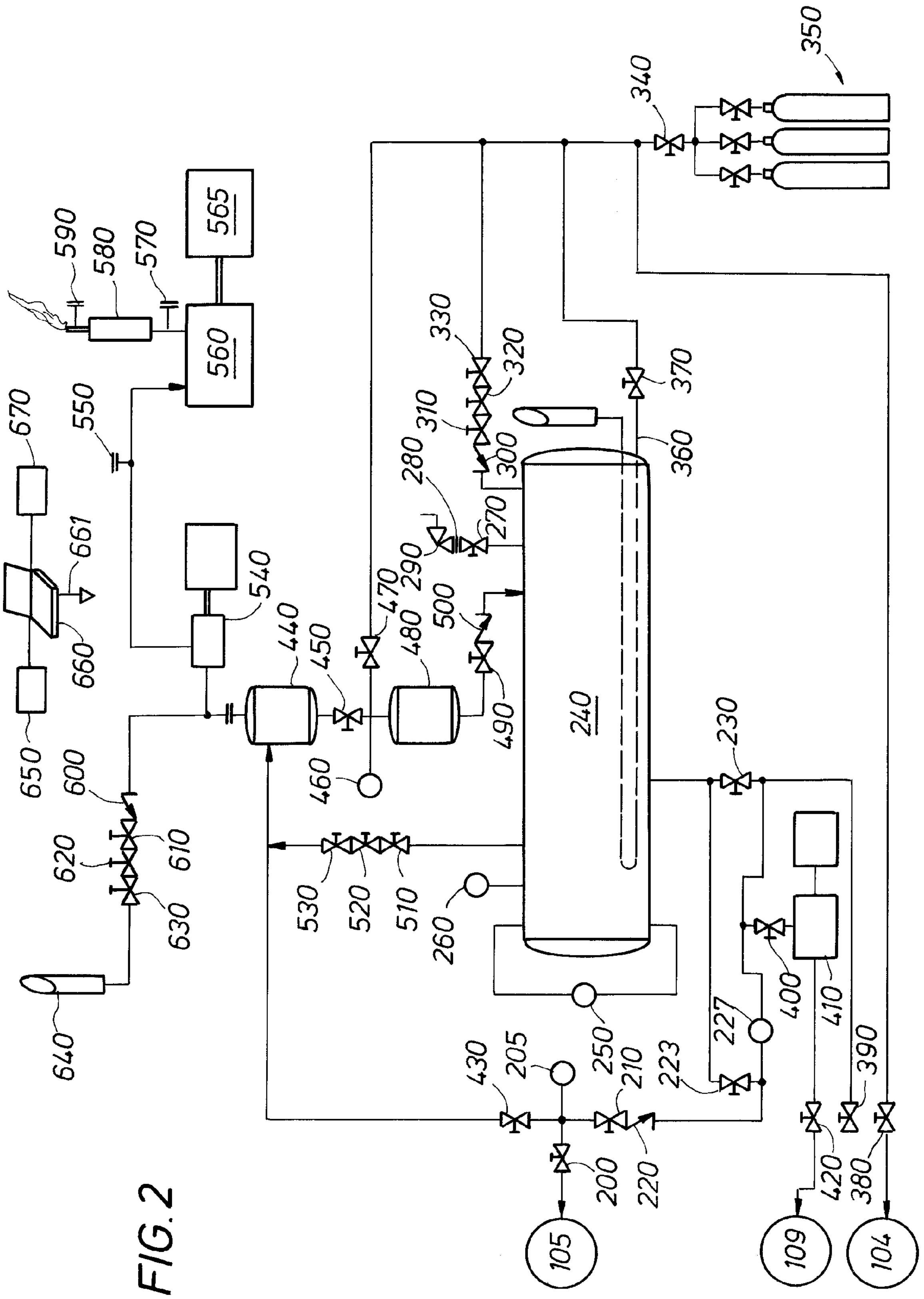
FIG. 2 is a piping diagram illustrating the functional parts of one embodiment of a system according to the present invention and how they are interconnected.

Once the pig is isolated in the pig trap as described above, the following should be accomplished:

a) A responsible operations person should check the trap valve 101 and the jump over valve 103 to make sure both valves are closed. If either of the valves is motor operated, the valve operator should be placed in the manual mode so that the valve cannot be remotely operated. Both valves are then appropriately “locked out and tagged out” for the duration of the time the pig trap (or other equipment) is being maintained. For the duration of the time the invention is in use, the invention operator should have the “lock out tag out” keys that lock the valves 101 and 103.

b) Once the trap valve and jump over valves have been secured, the protecting blind flanges or bull plugs should be removed from the drain valve 105 and a blow down valve 104. Once the blinds or plugs are removed, a flexible hose or line is attached to the pipe 110 at the drain valve 105 to connect the system of the present invention at a system block valve 200 as shown in FIG. 2 of the drawings. Another appropriate connection is also made that joins the blow down valve 104 to a purge system nitrogen connection 380 (FIG. 2) should be installed. To complete the system lineup, a recycle connection is coupled between a blowdown valve 109 and a recycle cutoff valve 420, shown also in FIG. 2.

c) All systems, motors and test equipment should be checked before transporting the system of FIG. 2 of this invention from the shop and the quantity of nitrogen (illustrated as nitrogen bottles 350 in FIG. 2) should be checked to make sure there is enough nitrogen to perform the planned operations in the field. Once the pig trap and other field equipment are connected to the invention, motors 540 and 560, generator and test equipment 650, central processing unit 660, and engine emissions analyzer 670 should be started and time allowed for the motors and test equipment to warm up and begin to operate properly. The equipment may include a central processing unit 660, which is coupled to the test equipment with wires or wirelessly. The central processing unit 660 also communicates with various points in the system through a communications bus 661, while the connections of the bus 661 are omitted here for simplicity.

d) While the motors and test equipment are warming up, a nitrogen blanket should be established on a product recovery vessel 240 by opening a nitrogen valve 340 and a nitrogen pressure regulator 320 that provides nitrogen to the product recovery tank 240. The product recovery tank 240 may include an internal vaporization exchanger 360 inside the product recovery tank 240 to vaporize liquid nitrogen and thereby cool higher vapor pressure products in the product recovery tank 240, such as ethylene, for example.

e) Next, the product recovery tank regulator 320 should be adjusted so that the regulator 320 will hold roughly 100 pounds per square inch gauge back pressure, depending on the product to be recovered, before relieving to a purge system liquid knockout drum 440. This regulator may require adjustment to adjust the back pressure to be higher or lower depending upon the ambient conditions and the product material being recovered.

f) A purge system block valve 430 should be closed and "lock out-tag out" procedures should be used to make sure this valve is closed until needed in the purging process.

g) A product recovery block valve 210 should be in the closed position but not locked out and a product recovery tank block valve 230 should be in the open position. A flow meter 227 should be reset to zero and a reading of the total flow noted. A flow reversal valve 223 should be in the closed position.

h) All connections between the invention and the pipeline operating equipment of FIG. 1 should be rechecked. The pig trap drain valve 105 should be checked to make sure that a secure connection exists to the system block valve 200 and that the pig trap blowdown valve 104 is connected to the nitrogen purge block valve 380.

i) Other valve positions and component states in the system are listed by number in the table below:

TABLE 1

| Component State/Position at the Start of Recovery Operations | | | | | |
|---|---|---|---|---|---|
| Component # | State | Component # | State | Component # | State |
| 400 | Open (if 420 is locked) | 420 | Closed/Locked | 390 | Closed |
| 370 | Closed | 330 | Open | 310 | Open |
| 270 | Open/Locked | 280 | Sealed | 490 | Closed |
| 470 | Closed | 450 | Closed | 510 | Open |
| 530 | Open | 630 | Open | 610 | Open |
| 410 | Off | 540 | On | 560 | On |
| 560 | On @ 550 | 670 | On @ 570 | 660 | On @ 670 |

Operating in the Product Recovery Mode

The purpose of the product recovery mode is to recover as much of the isolated product as possible so that the isolated product is not vented to the atmosphere; it is not flared to the atmosphere; and it can be returned to the pipeline or plant facility or the product can be carried to an offsite location and be beneficially recycled.

Product recovery, as considered in this invention, has distinct operational phases: a) in a first phase, 98% to more than 99% of the product is recovered while the pipeline system is under pressure (propane, for instance will be under roughly 200 to 250 psig of pressure) either from the pipeline due to product volatility or from nitrogen (from the storage area of the invention) applied to "chase" the pipeline product out of the pig trap; b) in a second phase, residual product that cannot be recovered is "sucked" out using vacuum and is combusted; c) a purge phase where the pipeline equipment is purged to the point that the system is safe to open, and finally d) recycling of the product that occurs when the recovery stage is complete. The recycle phase can be performed either onsite based on the instructions from the operations person or be performed offsite at an arranged location.

Once the equipment in the invention is set up, connected, and operating as defined in the prior section, the equipment operator can initiate the product recovery mode and follow the steps as outlined as follows:

1) Open the pig trap drain valve 105 and allow the flexible connecting tubing (not shown) to fill with the pipeline product previously isolated in the pig trap 107. Then open the system block valve 200. At this point there should be a reading of the pressure in the pig trap 107 on a pressure indicator 205. Once the pressure on the pressure indicator 205 has been noted, slowly open the product recovery block valve 210. At this point there should be a sound of product liquid entering the product recovery tank 240. The operator should watch a level indicator 250 on the product recovery tank 240 and the pressure indicator 250 while product is being recovered.

2) Once the sound of the flow of recovered product diminishes, the flow meter 227 can be monitored. Once flow stops due to the pressure equalization between the pig trap 107 and the product recovery tank 240, the nitrogen purge valve 380, which was originally connected to the pig trap blow down valve 104, can be opened to blow nitrogen through the pig trap 107. This will chase out any remaining liquid in the trap 107 to the product recovery tank 240. The equipment operator should now check the flow that has occurred through the flow meter 227 and compare the flow meter 227 reading to a calculation of the volume of fluid isolated in the trap 107. If the flow meter 227 reading and the pig trap 107 volume calculation are reasonably close, say within 5%, the product can be considered recovered and the purge mode can begin. Otherwise, the pig trap 107 should be chased with nitrogen until more product is recovered.

At this point the pig trap is considered to be empty of free flowing product and the purge cycle can begin.

The Product Purge Mode

The purpose of the purge mode of operation of the invention is to scavenge and purge the remaining hydrocarbon products, generally less than 2% of the original isolated volume, from the pig trap 107 without releasing or venting to the atmosphere or utilizing a flare. Meeting these two conditions of no venting and no flaring meets and exceeds the most stringent environmental regulations. Venting has stringent monitoring and reporting requirements that require expensive equipment and extensive reporting. Flaring is subject to complex regulations under the Code of Federal Regulations, 40 CFR §60.18, that requires the equipment operator to install expensive monitoring equipment, requires periodic testing, and requires extensive reporting. Since no flare is used in the purging process, the operator does not have to incur the capital costs, high maintenance costs, recordkeeping requirements, and manpower required to comply with 40 CFR § 60.18.

In addition, much of the cost of the product recovery and purging process is offset by the beneficial use of the product that was vented or flared in operations prior to the invention.

The previously described recovery process extracts and saves to the product recovery tank 240 about 98% of the hydrocarbon product isolated in the trap 107. A 6 inch pipeline pig trap, which will have an 8 inch diameter trap barrel some 6 feet in length with and 2 feet of 6 inch pipe will contain roughly 20 gallons of isolated product. The objective of the purging operation is therefore to remove less than 0.5 gallon of product remaining in the equipment without letting any product go to the atmosphere. Much of the product will be in the bottom of the trap 107 and will freely drain through the drain valve 105.

Once the product recovery mode is complete, the following operations should be performed for system purging and scavenging for remaining hydrocarbon vapors and residual liquids:

a) The product recovery block valve 210 should be closed and the lock should be removed from the purge system block valve 430 and placed on the product recovery block valve 210. The product recovery tank block valve 230 should be left open to prevent any pocketing of hydrocarbon vapors, in the event a highly volatile product has been recovered. The nitrogen valve 380 can be shut or throttled to low flow—shut being the generally preferred condition at the outset of the purge operations;

b) The invention operating personnel should make sure that the nitrogen test meter is running and connected to a sample point 550, that the engine emissions analyzer 670 is running and connected to a sample point 570 and may be easily connected to a sample point 590. In addition, the computer 660 should be running and able to acquire data from the engine analyzer 670 measuring the unburned hydrocarbon emissions from the sample points 570 and 590;

c) The engine 560, which functions as an oxidizer for the invention, should be running and the emissions analyzer 670 and the computer 660 should be calculating lambda (λ) for the operating engine;

d) A liquid accumulator drain valve 450 should be open and a nitrogen valve 470 should be closed a drain valve 490 to a liquid accumulator 480 should be closed;

e) Begin purging material to the vacuum pump 540 by slowly opening the purge system block valve 430. Stop opening when the ball valve handle is between an angle of 30 degrees to 45 degrees. Wait about a minute and listen if the vacuum pump 540 begins to load and feel the line with the hand between the purge system block valve 430 and the liquid knock out drum 440. This segment of line should become noticeably cooler over the next 60 to 120 seconds.

f) If the line segment described above becomes cooler, the liquid should be scavenged from the isolated portion of the pipeline equipment 107 in roughly 10 to 15 minutes.

g) At the end of the purging and scavenging portion of the operation, the person in charge of operating the pipeline 100 equipment may desire to further purge the pipeline equipment with additional nitrogen 350. If this is desired, open the nitrogen purge block valve 380 and allow enough nitrogen to flow to turn over two to three times the volume of the isolated product. This purging with nitrogen will normally be enough so that the pig trap 107 may be opened to remove a pig trapped in the pig trap.

h) At the end of the purging process, shut down the engine 560, the vacuum pump 540, shut the nitrogen valves 340 and 380, open the liquid accumulator drain valve 490 and allow any accumulated liquid to flow into the product recovery tank 240. Once the liquid in the accumulator is sent to the product recovery tank 240, then the accumulator drain valve 490 should be closed again. The purge system block valve 430 should be closed and locked. The system block valve 200 should be closed and the flexible line removed from the system block valve 200 and the trap drain valve 105. The nitrogen line should be removed from the nitrogen purge block valve 380 and the trap blow down valve 104.

Operating in the Product Return or Recycle Mode

Based on the product purity and contamination specifications, the recovered product in the product recovery tank 240 may now be returned to the pipeline system 100 or beneficially recycled to an offsite facility.

The procedure to return the product to the pipeline system can be performed as follows:

a) Connect a temporary line (not shown) to a pipeline blow down valve 109 to the product return block valve 420.

b) Close the product recovery block valve 230, open the flow reversal valve 223, make sure the product recovery block valve is closed 210, and open the pump block valve 400 and the product return block valve 420.

c) Reset the flow meter 227 to zero or note the totalized flow reading.

d) Start a product return pump 410 and allow the pump to return the product back to the pipeline system 100.

e) Once the product recovery tank 240 is empty, remove the temporary line from the pipeline blow down valve 109 and from the product return block valve 420.

f) Return the equipment settings and positions to the settings in the product recovery operational mode disclosed elsewhere herein.

At this point the product recovery, purging and product return operations at this site are complete.

TABLE 2

Parts List

| # | Name | Purpose |
|---|---|---|
| FIG. 1 | Pipeline Equipment 101-109 | Invention Example - This is a common activity in pipeline operations, however, other examples could be used, such as changing the filter in a meter run, changing prover balls, etc. |
| 100 | Pipe line system | The system through which pipe line products flow from one destination to another. |
| 101 | Trap Valve Block valve) | Allows pig or swab to enter and isolates the pig or swab from the pipeline system. The valve is normally closed but is open during pigging operations. |
| 102 | Trap Bypass Valve (block valve) | The path of flow during normal non-pigging operations. During pigging operations, this valve is closed until the pig is in the pig trap. Then the valve is reopened in the process described herein. |

TABLE 2-continued

Parts List

| # | Name | Purpose |
| --- | --- | --- |
| 103 | Jump Over Valve (block valve) | The Jump Over Valve enables flow through the pig trap when the trap valve 101 is open. Closing the trap valve 101 and the jump over valve isolates the pig trap so the pig can be removed. |
| 104 | Blow Down Valve | A small valve used to provide access to the pig trap for purging the pig trap before opening. The invention uses this as one of two connections for the recovery of the product material with the pig in the pig trap. |
| 105 | Trap Drain Valve | The Trap Drain Valve is opened to drain the trapped product out of the pig trap so the pig can be recovered. This drain valve is a connection for the invention to recover trapped product. |
| 106 | Trap Closure | The trap closure is the method of inserting and removing the pig or swab from the pig trap. The trap closure is normally a "hammer flange" with a gasket and is opened by hitting he flange with spark proof sledge hammer so that it screws on or off. |
| 107 | Trap Barrel | The trap barrel is normally 2 inches larger in diameter than the incoming pipeline diameter. This allows enough room to insert and remove the pig or swab from the |
| 108 | Test Valve | This valve is used for the testing of pipeline product composition when the pipeline is being emptied with another product like nitrogen to test when to begin recovering product to the invention rather than sending the product on down the line. |
| 109 | Pipeline Blow Down Valve | This is a small valve like 104 described above except that it is located on the pipeline/pressurized side of the pig trap and is used as a return point for product recovered by the invention. |
| FIG. 2 | Diagram of the Invention | |
| 200 | System Block Valve | This valve controls all recovery operations. This valve is connected by flexible pressure capable piping to the trap drain valve 105 using the smallest practical tubing diameter. |
| 205 | Pressure Indicator | This pressure indicator shows the pressure in the pig trap 107 once one has entered the product recovery mode |
| 210 | Product Recovery Block Valve | This valve provides access to the Product Recovery Tank 240 |
| 220 | Product Recovery Check Valve | This component prevents flow reversal of recovered product into the vacuum purge system |
| 223 | Flow Reversal Valve | This valve is opened along with valve 400 and valve 230 and valve 210 is closed so flow can be metered through the pump 410 |
| 227 | Flow Meter | This flow meter measures the flow rate and total flow to the product recovery tank 240 and the amount of product off loaded through the product pump 410 |
| 230 | Product Recovery Tank Block Valve | This valve is normally open but is provided to allow maintenance and change out of other equipment in the recovery system. |
| 240 | Product Recovery Tank | This is a holding tank for recovered product from the pipeline pig trap or other operation. The product is held and either re-injected into the pipeline at the pipeline blow down valve 109 or carried to a recycling facility at another location. |
| 250 | Level Indicator Sight Glass | The level indicator is any one of several types of level indicators that may be used to monitor the level in the product recovery tank - for this particular example a sight glass and level bridle is shown. |
| 260 | Pressure Indicator | The pressure indicator is a pressure gauge to show the pressure in the product recovery tank 240. |
| 270 | Relief Block Valve | This is a block valve that is normally open and would be car sealed open that can be closed to perform maintenance on the pressure relief valve 290 or rupture disk 280. |
| 280 | Rupture Disk | The rupture disk is a portion of the safety system and is designed to rupture some 10 psia lower than the relief valve 290. The rupture disk is provided to prevent potential corrosion in the relief valve 290. |

TABLE 2-continued

| | Parts List | |
|---|---|---|
| # | Name | Purpose |
| 290 | Relief Valve | The relief valve is provided for any overpressure event that might occur when product is sent to the product recovery tank 240, e.g., there is volatile high pressure product contained in the pig trap and that product is accidentally sent to the product recovery tank 240 |
| 300 | Nitrogen Blanket Check Valve | This is a check valve provided so that flow reversal into the nitrogen system from the product recovery tank 240 will not occur. |
| 310 | Regulator Block Valve | This is one of two regulator block valves so that the nitrogen pressure regulator 320 can be maintained. |
| 320 | Nitrogen Pressure Regulator | The nitrogen pressure regulator controls the pressure of the nitrogen blanket on the recovered product in the product recovery tank 240. The ability to control the pressure in the product recovery tank 240 allows flow and net positive suction head to be controlled by the equipment operator. |
| 330 | Regulator Block Valve | This is one of two block valves so that the nitrogen pressure regulator 320 can be maintained. |
| 340 | Nitrogen Block Valve | This is the valve controlling access to a source of nitrogen used for blanketing and purging during product recovery operations of the invention. The nitrogen source could be bottled nitrogen, liquefied nitrogen or manufactured nitrogen. |
| 350 | Nitrogen Source | This is the nitrogen source for the purging and blanketing operations of the invention and may be bottled nitrogen, liquefied nitrogen, or manufactured nitrogen from a permeable membrane system |
| 360 | Vaporization Exchanger | The product recovery tank 240 may include an internal vaporization exchanger inside the product recovery tank 240 to vaporize liquid nitrogen and thereby cool higher vapor pressure products in the product recovery tank 240, e.g., ethylene |
| 370 | Vaporization Exchanger Block Valve | This valve controls the flow of cooling material liquid nitrogen to the vaporization exchanger 360. |
| 380 | Nitrogen Purge Block Valve | This valve controls the flow of nitrogen 350 used as a purge gas during and after the recovery operations have occurred. |
| 390 | Recycle Valve | This valve is for the off loading of recovered product at a product recycle location which is not necessarily at the location where the recovery occurred. Recovered product may be off loaded by opening this valve and pressuring up the recovery tank 240 with nitrogen 350 |
| 400 | Pump Block Valve | This valve blocks in the recycle pump 410. The recycle pump is capable of returning product held in the product recovery tank 240 back to the pipeline through the pipeline blow down valve 109. |
| 410 | Product Return/Recycle Pump | This product return or recycle pump returns the recovered material in the product recovery tank 240 back to the pipeline system 100. The pump is capable of pump pressures that enable the recovered product to be returned to the pipeline system 100 which may be several hundred pounds per square inch. |
| 420 | Product Return Block Valve | This valve controls the off loading of recycled product back to the pipeline system 100. This valve is connected using flexible piping to the pipeline blow down valve 109. |
| 430 | Purge System Block Valve | Opening this valve activates the vacuum purge system. |
| 440 | Liquid Knock Out Drum | The liquid knock out drum recovers entrained liquid in the vapor stream to the vacuum pump. Liquid may be either entrained in the vapor or prevents damage to the vacuum pump if the Purge system Block Valve 430 is accidentally opened. The product recovery check valve 220 prevents recovered product from being drawn from the product recovery tank 240 into the vacuum purge system. |

TABLE 2-continued

| Parts List | | |
|---|---|---|
| # | Name | Purpose |
| 450 | Liquid Drain | This valve allows liquids accumulated in the Liquid Knock Out Drum 440 to free drain into the Liquid Accumulator 480 so that there is little or no liquid level in the liquid knock out drum 440. |
| 460 | Pressure indicator on liquid accumulator | This is a pressure indicator used when the liquid drain valve 450 is closed and the liquid accumulator is pressured with nitrogen by opening the liquid accumulator nitrogen valve 470. When the liquid accumulator pressure indicator is greater than the pressure read on the pressure indicator 260 on the product recovery tank 240, then the accumulator drain valve 490 is opened and liquid in the liquid accumulator 480 is sent to the product recovery tank 240. |
| 470 | Nitrogen Pressurization Valve | When the Liquid drain valve 450 is closed then the nitrogen pressurization valve is opened until the pressure on the pressure indicator 460 is greater than the pressure on the pressure indicator 260 located on the product recovery tank 240. The liquid accumulator drain valve 490 is then opened and any accumulated liquid is sent to the product recovery tank 240. Once the liquid has been sent to the product recovery tank 240 from the liquid accumulator 480, then the nitrogen valve is closed 470, the liquid accumulator drain valve 490 is closed and the liquid drain valve 450 is reopened for any additional liquid to pass to the liquid accumulator 480. |
| 480 | Liquid accumulator | The liquid accumulator retains any liquids gathered by the liquid knockout drum 440 until sufficient liquid is present to be sent to the product recovery tank 240. |
| 490 | Liquid accumulator drain valve | The liquid accumulator drain valve, when opened and the liquid accumulator 480 is pressurized, allows accumulated liquid entrained in the purging operation to be sent to the product recovery tank 240 |
| 500 | Liquid accumulator check valve | The liquid accumulator check valve prevents flow reversals due to pressure differences between the vacuum in the liquid knock out drum 440 and the pressure in the product recovery tank 240 |
| 510 | Regulator Block Valve | This valve is present to allow maintenance and/or replacement of the pressure regulator on the product recovery tank 240. |
| 520 | Product Recovery Tank 240 Pressure Regulator | This regulator maintains a constant pressure on the product recovery tank that can fluctuate during filling operations and/or when flash vaporization occurs in the product recovery tank 240. Pressure regulation in emptying operations is controlled by the nitrogen pressure regulator 320. |
| 530 | Regulator Block Valve | This valve is present to allow maintenance and/or replacement of the pressure regulator on the product recovery tank 240. |
| 540 | Vacuum Pump | Once the initial product recovery is complete and the maximum amount of product is stored in the product recovery tank 240, the purging process is initiated by using a vacuum pump. This is accomplished by closing valve 210 and opening valve 430 which begins to draw unrecovered product from the pig trap through the drain valve 105 and temporary piping connecting the system block valve 200. Drawing a vacuum on the remaining product in the pig trap will tend to vaporize any remaining product as can be seen when the thermodynamic and physical properties of the recovered products are examined. |
| 550 | Sample Point 2 | This sample point is located on the discharge of the vacuum pump, which has a pressure higher than atmospheric pressure and enables sampling of the percentage of product and the percentage of nitrogen, used as a purge gas through valve 380. This allows the operator to determine when the purge operation has reduced the product concentration to the point that the product recovery and purge is complete. |

TABLE 2-continued

| | Parts List | |
|---|---|---|
| # | Name | Purpose |
| 560 | Engine | This is an internal combustion engine capable of running on low octane fuels. The engine drives an air compressor 565 designed to load the engine to increase the engine's fuel consumption. An engine normally has an unburned hydrocarbon concentration between 10 and 100 parts per million by volume and is vastly more efficient than flaring - whose efficiency is generally 98 to 99 percent combustion or roughly 10,000 to 20,000 parts per million by volume concentration of unburned hydrocarbons.<br>The discharge from the vacuum pump 540 is sent directly to the inlet air suction of the engine and the hydrocarbon is combusted/oxidized in the engine. Engine performance is monitored by an engine analyzer at sample point 3 570. |
| 565 | Air Compressor | The purpose of the air compressor is to provide a variable load for the engine 560 and to make the engine 560 require more fuel and increase the amount of gases that can be combusted from the vacuum pump 540. |
| 570 | Sample Point 3 | Sample point 3 is the location where the performance of the engine may be ascertained. By measuring the residual oxygen concentration in the combustion gas, the carbon dioxide concentration, and the outlet nitrogen, the value of lambda λ) can be determined. The value of lambda allows a butterfly valve to be adjusted on the air intake to compensate engine performance while combusting the outlet gas from the discharge of the vacuum pump 540 |
| 580 | Catalytic Converter | The purpose of the catalytic converter is to further combust/oxidize unburned hydrocarbon that might remain in the engine exhaust stream from the engine 560 |
| 590 | Sample Point 4 | The purpose of sample point 4 is the location where the overall air emissions of the product recovery and product purging process are located. An engine analyzer may be used for this to provide he concentration of unburned hydrocarbons |
| 600 | Emergency flare check valve | This component prevents flow reversal in the emergency flare system that automatically actuates if the vacuum pump cannot retain a vacuum on the purging system. |
| 610 | Regulator Block Valve | This component enables the regulator 620 to be maintained |
| 620 | Emergency Regulator | This regulator allows flow to an "emergency flare" or vent in the event an excess of gas or vapor is encountered that cannot be handled by the vacuum pump 540. The regulator is used to be able to predetermine the point at which emergency action takes place. |
| 630 | Regulator Block Valve | This component enables the regulator 620 to be maintained |
| 640 | Emergency Flare or Vent | This is for system safety in the event "slugs" of vapor or entrained gas are encountered. |
| 650 | Nitrogen analyzer | This meter is used at sample point 1 108 and sample point 2 550 to determine the nitrogen concentration. The information from the nitrogen meter at sample point 1 108 is used to determine when the product recovery phase is initiated if a line is being pigged with nitrogen. The nitrogen concentration at sample point 2 550 provides information as to the progress of the purging operation following the product recovery phase of operation |
| 660 | Computer | The computer is used to monitor, compute algorithms and gather data related to the engine analyzer 670 and its two monitoring locations |
| 670 | Engine analyzer | The engine analyzer is used to analyze the following combustion products after the combustion at sample point 3 570 and the catalytic oxidation at sample point 4 590. The analyzer should be capable of reading unburned hydrocarbons, carbon dioxide, and unconsumed |

TABLE 2-continued

| Parts List | | |
|---|---|---|
| # | Name | Purpose |
| | | oxygen at a sample rate occurring less than once a minute. Sample point 3 570 monitors engine performance and sample point 4 590 monitors environmental emissions performance. |

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

I claim:

1. A method for reducing emissions of volatile organic compounds in petrochemical pipeline and plant operations associated with oil and gas production, refining and distribution and petrochemical manufacturing and distribution, wherein the operation includes at least one system of piping and valves constructed and adapted to isolate a portion of the product from the main flow into an isolation vessel, said isolation vessel including at least one drain valve and at least one blowdown valve, said method comprising:

capturing a quantity of the product within the isolation vessel;

temporarily connecting the drain valve of said isolation vessel to a product recovery system block valve and connecting the blowdown valve to a nitrogen purge block valve as a safety precaution;

causing a flow of volatile organic compounds isolated in the isolation vessel from the isolation vessel through the drain valve to a product recovery tank under a positive pressure;

generating a negative pressure within the isolation vessel so as to completely purge said isolation vessel of any remaining product and move it into the product recovery tank, and disconnecting said product recovery tank from the isolation vessel with said quantity of product captured therein;

wherein an internal combustion engine operatively connected to suitable pumping and purging means is the active source of any pumping or purging negative pressure.

2. The method of claim 1, wherein the isolation vessel is a pig trap.

3. The method of claim 2, wherein the product is almost completely recovered while the pipeline system is under pressure, either from the pipeline due to product volatility or from nitrogen applied to chase the pipeline product out of the pig trap.

4. The method of claim 3, further comprising a product recovery stage wherein residual product that cannot be recovered is sucked out of the pipeline system using vacuum and is combusted.

5. The method of claim 4, further comprising the step of purging the pipeline system to the point that the system is safe to open.

6. The method of claim 4, further comprising the step of recycling the product that occurs when the recovery stage is complete.

7. The method of claim 6, wherein the recycle stage can be performed either onsite based on the instructions from an operations person or is performed offsite at an arranged location.

8. A system for reducing emissions of volatile organic product in a petrochemical operation, wherein the operation includes at least one system of piping and valves which isolate a portion of product from the main flow into an isolation vessel, the isolation vessel including at least one drain valve and at least one blowdown valve, said system comprising:

a flexible line adapted for temporarily coupling to the drain valve of the isolation vessel;

a product recovery system block valve adapted to couple to the drain valve of the isolation vessel by way of the flexible line;

a product recovery tank in fluid communication with the product recovery system block valve to receive product isolated from the operation;

a vacuum pump for generating a negative pressure within the isolation vessel to purge the isolation vessel of any remaining product and move it into the product recovery tank; and an internal combustion engine to combust product isolated in the product recovery tank to reduce venting and flaring of product isolated from the operation.

9. The system of claim 8, wherein the isolation vessel is a pig trap.

10. The system of claim 8, wherein the system is portable from one operation to another.

11. The system of claim 8, further comprising a vaporization exchanger within the product recovery tank.

* * * * *